(12) United States Patent
Otto

(10) Patent No.: US 8,020,648 B2
(45) Date of Patent: Sep. 20, 2011

(54) WINDROWER TRACTOR WITH REAR WHEEL SUSPENSION

(75) Inventor: Philip J. Otto, Winnipeg (CA)

(73) Assignee: MacDon Industries Ltd., Winnipeg, MB (CA)

( * ) Notice: Subject to any disclaimer, the term of this patent is extended or adjusted under 35 U.S.C. 154(b) by 0 days.

(21) Appl. No.: 12/719,990

(22) Filed: Mar. 9, 2010

(65) Prior Publication Data

US 2010/0230182 A1   Sep. 16, 2010

Related U.S. Application Data

(60) Provisional application No. 61/159,592, filed on Mar. 12, 2009.

(51) Int. Cl.
*B62D 11/02* (2006.01)

(52) U.S. Cl. .............................. 180/6.48; 280/124.116

(58) Field of Classification Search .............. 180/6.2, 180/6.48, 209; 280/124.116, 124.166, 124.167, 280/124.169, 124.133, 124.134
See application file for complete search history.

(56) References Cited

U.S. PATENT DOCUMENTS

| | | | | |
|---|---|---|---|---|
| 2,808,269 A | * | 10/1957 | Cathey | 280/93.5 |
| 4,154,451 A | * | 5/1979 | Young | 280/86 |
| 4,410,194 A | * | 10/1983 | Steilen | 280/86 |
| 7,077,220 B2 | * | 7/2006 | Dunn et al. | 180/6.2 |
| 7,252,169 B2 | | 8/2007 | McLean | |
| 2009/0174166 A1 | * | 7/2009 | Sloan et al. | 280/124.116 |
| 2010/0201095 A1 | * | 8/2010 | Stephenson et al. | 280/124.166 |

* cited by examiner

*Primary Examiner* — Anne Marie Boehler
*Assistant Examiner* — Tashiana Adams
(74) *Attorney, Agent, or Firm* — Adrian D. Battison; Ade & Company Inc.

(57) ABSTRACT

A tractor has front wheels mounted on the frame at fixed angles and a pair of rear wheels each mounted on a respective castor assembly. Each of the castor assemblies has a vertical pivot axis mounted in a swivel support of an axle of the frame and a bottom transverse tubular member connected to a pair of parallel forks carrying at a lower ends the transverse axle of the wheel. The mounting link includes a torsion spring defined by a rod attached to the forks which passes though a sleeve containing a resilient elastomeric spring of the tubular member allowing spring suspension pivotal movement of the upper ends of the forks relative to the bottom transverse member about an axis parallel to the wheel axis.

18 Claims, 4 Drawing Sheets

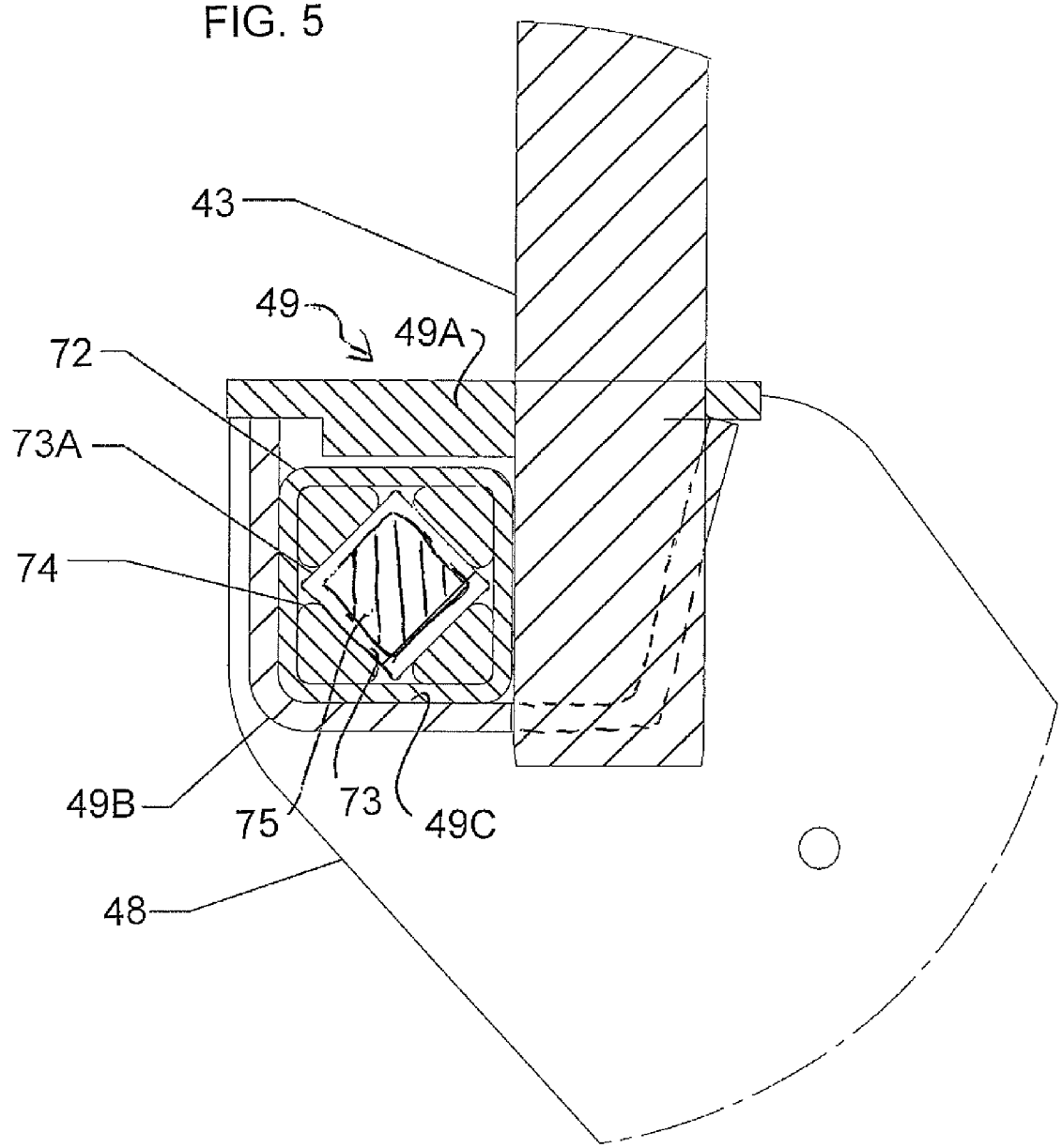

WINDROWER TRACTOR WITH REAR WHEEL SUSPENSION

This application claims the benefit under 35 U.S.C. 119 of the filing date of Provisional Application 61/159,592 filed Mar. 12, 2009.

This invention relates to a swather or windrower tractor with rear wheel suspension.

BACKGROUND OF THE INVENTION

In U.S. Pat. No. 7,077,220 (Dunn) issued Jul. 18, 2006 and assigned to the present Assignees is disclosed a hydrostatic agricultural tractor used as a self propelled swather tractor. This uses the typical construction for such tractors which has front ground wheels mounted on the frame at fixed angles parallel to each other and parallel to a center line of the frame and rear ground wheels mounted on a respective castor. Each of the front ground wheels is driven by a respective drive motor which allows variable speed in both the first and second directions such that steering of the tractor is effected by a differential in speed between the front wheels with the rear wheels following the steering in a castoring action. A pair of damper cylinders is provided, each connected between a bracket on a rear axle of the frame and a lever in the castor plane of the castor so as to provide a damping force tending to restrict rotation of the respective second wheel about the respective vertical pivot axis with the damping force at a maximum value when the rear wheels are parallel to the center line in either the forward or reverse directions.

Such hydrostatically driven tractors used primarily for swathing are commonly used and readily available. The tractor carries at a forward end on suitable sprung supports a header for cutting standing crop with the crop being transported on the header to a suitable discharge location generally centrally of the tractor for forming a swath in the field from the cut crop.

Such tractors generally include a pair of front wheels just behind the header which are fixed to the frame of the tractor so that they remain at an angle parallel to each other and parallel to a center line of the tractor. The tractor is supported at the rear end by a pair of castor wheels which are attached to a cross axle pivotally connected to the frame at a center horizontal pivot point, commonly known as a walking beam. The axle is supported relative to the ground the castor wheels at the ends of the rear axle so that the wheels trail behind a vertical pivot mount for the wheels and are free to swivel through 360° around the pivot mount.

The front wheels only are driven and are driven in a manner which allows full control in the forward and reverse directions so that steering is effected by a differential speed between the two front wheels with the rear wheels following in the conventional castoring action.

It is also known that such tractors can travel more effectively at high speed when reversed in direction so that the driven wheels are at the rear and the castor wheels at the front. The castor wheels of course rotate through 180° to trail behind the vertical pivot which is now forward of the castor wheels as the tractor moves at relatively high speed in this reversed direction.

Castor shimmy is an inherent problem on tractors of the above type. Recent machines have been increased in speed up to a maximum road speed of 24 mph instead of 16 which is the standard in the industry now. Speed aggravates the shimmy problem.

Loss of ground contact (going over bumps) also aggravates the problem and as a result weight is often added to prevent this. This results in increased power requirements and increased fuel consumption.

Up to now many such tractors use as the rear suspension of the rear castor wheels the simple pivoting rear axle or walking beam and while speeds have been relatively low, this has been acceptable. Of course the tires themselves also provide flexure which contributes to the suspension. However the use of only the tires as a suspension in rough terrain can cause sever pitching leading to significant fore and aft acceleration of the operator station.

Attempts have been made to provide a more effective suspension of the rear axle and one example is shown in U.S. Pat. No. 7,252,169 (McLean) issued Aug. 7, 2007 and assigned to CNH. This provides an arrangement in which the rear axle is split into two components each having an air spring to absorb shocks. This arrangement has obtained some acceptability but is relatively complex.

Another arrangement is shown in US Published application 2009/0174166 (Sloan et al) assigned to Deere which shows a suspension arrangement for a swather tractor which includes a frame and a rear axle rigidly carried by and substantially immovable relative to the frame. The suspension arrangement includes a caster wheel assembly having a shaft, a wheel arm, a suspension and a caster wheel. The shaft is mounted on an outboard end of the rear axle. The caster wheel is coupled with a lower end of the wheel arm. The suspension is in the form of a torsion spring including an outer tube, an inner member, and a plurality of elastomeric members interposed between the outer tube and the inner member. The outer tube is coupled with the shaft, and the inner member is coupled with an upper end of the wheel arm.

SUMMARY OF THE INVENTION

It is one object of the invention to provide an improved tractor of the above type including a suspension system for the rear wheels.

According to one aspect of the invention there is provided an agricultural tractor comprising:

a tractor frame arranged for attachment to an implement to be moved in a longitudinal working direction across the ground;

a first pair of ground wheels mounted on the frame at positions spaced transversely of the frame on either side of a center line of the frame;

a transverse beam mounted on the frame at a position spaced longitudinally from the first pair of ground wheels;

a second pair of ground wheels mounted on the beam at respective ends thereof;

the beam being mounted on the frame for pivotal movement about a substantially horizontal axis along the center line of the tractor;

each of the second ground wheels being mounted on the beam by a respective castor assembly;

each of the castor assemblies comprising:

a transverse axle of the wheel, a pivot member having a vertical rod defining a vertical pivot axis mounted in a swivel support of the beam and a bottom transverse member connected to a bottom of the vertical pivot rod, a mounting link interconnecting the bottom transverse member and the axle such that the axle is located below the pivot member and, in respect of a forward direction of movement, in a plane radial to the vertical pivot axis and rearwardly of the vertical pivot axis, the mounting link including a torsion spring allowing spring suspension pivotal movement of the upper ends mounting link relative to the bottom transverse member about an axis parallel to the wheel axis.

Preferably the torsion spring comprises a sleeve with a rod passing through the sleeve and an elastomeric mounting between the sleeve and the rod which allows rotation of the rod relative to the sleeve.

Preferably the sleeve is defined by the bottom transverse member of the pivot member and the rod extends across an upper end of the mounting link.

Preferably the rod is square in cross section and has at least one end fastened to the upper end of the mounting link.

Preferably the bottom transverse member comprises a tubular member with the vertical pivot rod passing through the tubular member.

Preferably the torsion spring is mounted inside the tubular member at a position on a side of the vertical pivot rod which is opposite to that of the wheel.

Preferably the mounting link is arranged to allow rotation of the wheel around the pivot axis so that the tractor can move in the direction of forward working movement with the first pair of ground wheels forward and the second pair of ground wheels trailing and in a second direction of movement opposite to the direction of forward working movement with the second pair of ground wheels forward and the first pair of ground wheels trailing.

Preferably each of the first pair of ground wheels is driven by a respective drive motor which allows variable speed in both the first and second directions such that steering of the tractor is effected by a differential in speed between the first wheels with the second wheels following the steering in a castoring action.

Preferably there is provided a pair of damper cylinders each connected between the frame and a respective one of a pair of levers where each lever is arranged at a respective one of the castor assemblies so as to provide a damping force tending to restrict rotation of the respective second wheel about the respective vertical pivot axis.

Preferably the damper cylinders and the levers are arranged such that the damping force for each castor assembly varies at different angles around the vertical pivot axis due to changes in mechanical advantage as the lever pivots around the vertical pivot axis and is at a maximum value when the second wheels are parallel to the center line and the tractor is moving in the direction of forward working movement and is at a maximum value when the second wheels are parallel to the center line and the tractor is moving in the opposite direction.

Preferably the mounting link includes a pair of parallel forks having upper ends of the forks connected to respective ends of the bottom transverse member and carry at a lower ends of the forks between the forks the transverse axle of the wheel.

Preferably the sleeve is defined by the bottom transverse member of the pivot member and the rod extends between the upper ends of the forks.

The torsion arm suspension system described herein is simple with few moving parts. The two rear caster wheels can move independently of each other while remaining connected through a solid beam rigidly connected to the main frame of the tractor. This arrangement provides greater articulation and requires less strength than an arrangement using a pivotal rear axle, particularly at the area where the beam pivots at the frame. The arrangement also provides a reduced shock loading of walking beam and caster components. The suspension can react faster due to less mass of the suspension components. The suspension provides dampening in some cases without the need for hydraulic shock absorbers. The rubber will inherently help to dampen the suspension but additional dampening, like a shock absorber, may be provided.

It may be necessary in some cases to limit the rotation of the suspension to prevent excess loading of the elastomeric parts. This can be provided by a stop member arranged to limit the rotation. In normal operation there will be some type of weight (either a header, trailer or weight box) that will reduce load on the rear wheels. If this weight is removed, the machine must still be able to function with much increased load on the rear wheels.

The invention will work with or without the anti-shimmy feature described herein.

BRIEF DESCRIPTION OF THE DRAWINGS

One embodiment of the invention will now be described in conjunction with the accompanying drawings in which:

FIG. 5 is cross sectional view on an enlarged scale of a portion only of FIG. 4 of the castor wheel of FIG. 2.

In the drawings like characters of reference indicate corresponding parts in the different figures.

DETAILED DESCRIPTION

Figure 1:
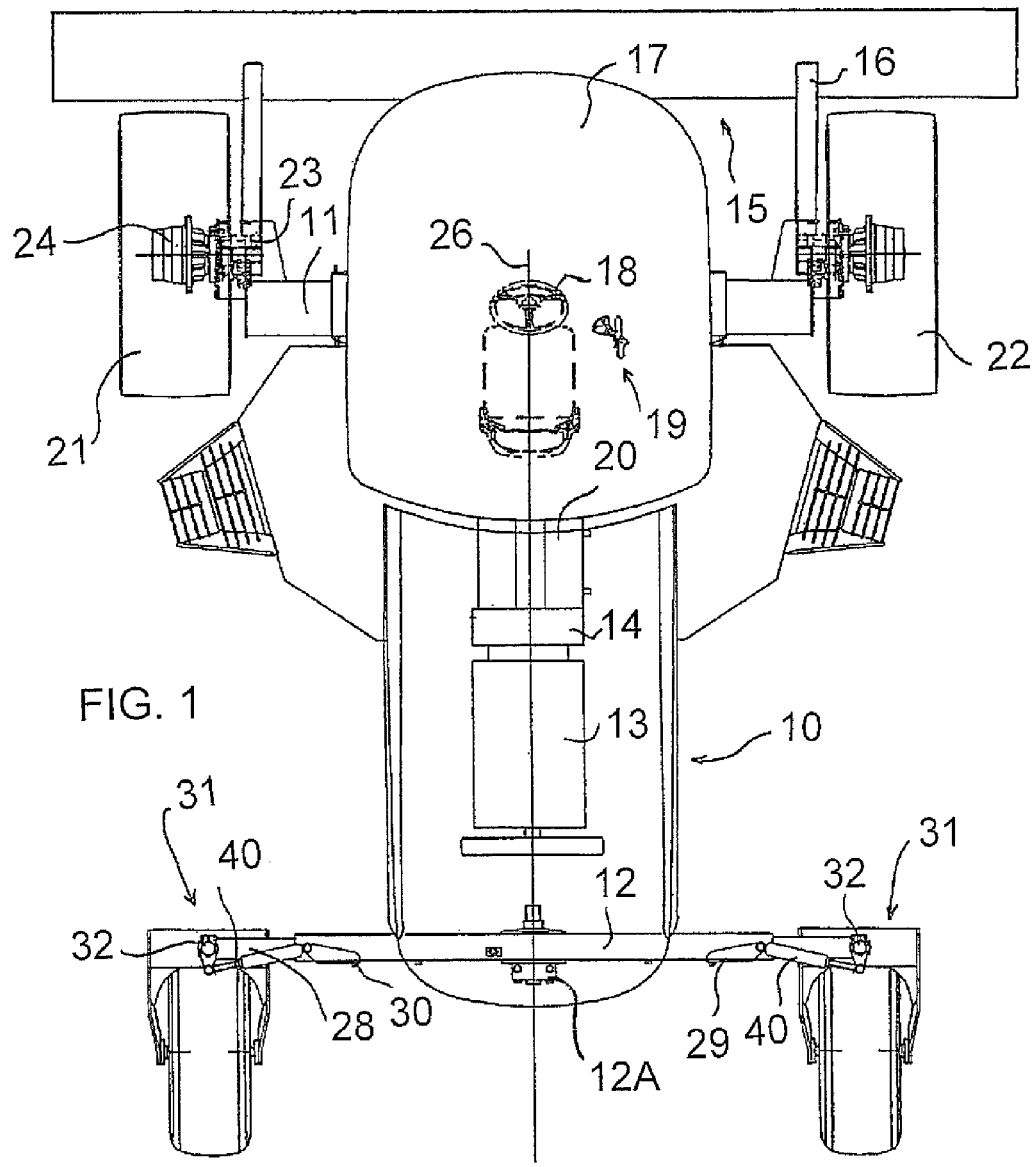
FIG. 1 is a top plan view taken from U.S. Pat. No. 7,077, 220 above which has been modified to include a suspension arrangement for the castor wheels according to the present invention.

In FIG. 1 is shown a tractor of the above type which includes a frame 10 with a front axle 11 and a rear axle 12. On the frame 10 is mounted a motor 13 driving a gear box and pump assembly schematically indicated at 14 for communicating hydraulic drive fluid to the various components of the tractor for propelling the tractor and for driving an implement 15 mounted on the tractor. In one example, the engine drives a gearbox at the rear of the engine that splits the power to two pump assemblies. One pump assembly has two pumps (one for each wheel) for traction drive & each pump controls one wheel. The other pump assembly has four pumps (two for header drive, one for lift functions and one providing supercharge oil). In the embodiment shown the implement is a header arranged for cutting a standing crop with the header carried on support arms 16 mounted on the tractor at the forward end in conventional manner. The tractor includes a cab 17 including steering 18 and control elements 19 operable by the driver with those control elements and steering acting to communicate control movements to a fluid control system generally indicated at 20 which supplies the fluid to the various elements to be driven.

The tractor includes first wheels 21 and 22 mounted on legs 23 extending downwardly from the front axle 11. Each leg carries a drive motor 24 for providing drive power to the respective wheel 21, 22 in response to the supply of hydraulic fluid from the control unit 20. The wheels 21 and 22 are mounted on hubs attached to the motors 24 so that the wheels are supported at a fixed angle to the frame so as to be parallel to each other and parallel to a center line 26 of the tractor. Thus the tractor is not steered by pivotal movements of the wheels which are fixed.

The rear axle 12 carries adjustable portions 28 and 29 which can be moved inwardly and locked by connecting bolts 30 at a required spacing from the center line 26 thus allowing adjustment of the track of the vehicle. Outwardly the beam also can be non-adjustable and this invention will work equally as well on it. The rear axle is mounted for pivotal movement on a center pivot 12A defining a horizontal axis longitudinal of the center line of the tractor so as to form what is commonly known as a walking beam. At the outer end of each portion 28, 29 is mounted a respective castor wheel 31 which can swivel around a vertical pivot member 32 of the castor. Thus the wheels on the axle 12 are castor wheels which are again not steered but merely free to rotate around the vertical axis defined by the pivot 32.

Tractors of this type are well known and are highly manoeuvrable since the steering is effected by differential speed or differential rotation of the wheels 21 and 22 with the castor wheels 31 merely following the steering action as required. It is well known that such tractors are generally used with the driven wheels 21 and 22 forward so that the implement is in front of those wheels.

However for high speed movement the vehicle is driven in the opposite direction so that the driven wheels 21 and 22 are at the rear and the castor wheels are at the front. This is known to provide an improved stability of the tractor at higher transport speeds and may provide an improved arrangement for transporting the implement which not in use. Each of the castor wheels 31 includes a damper 40 which connects between the castor wheel and the extendable portion 28, 29 of the tractor so as to prevent or reduce castor wheel shimmy as described herein before.

Figure 2:
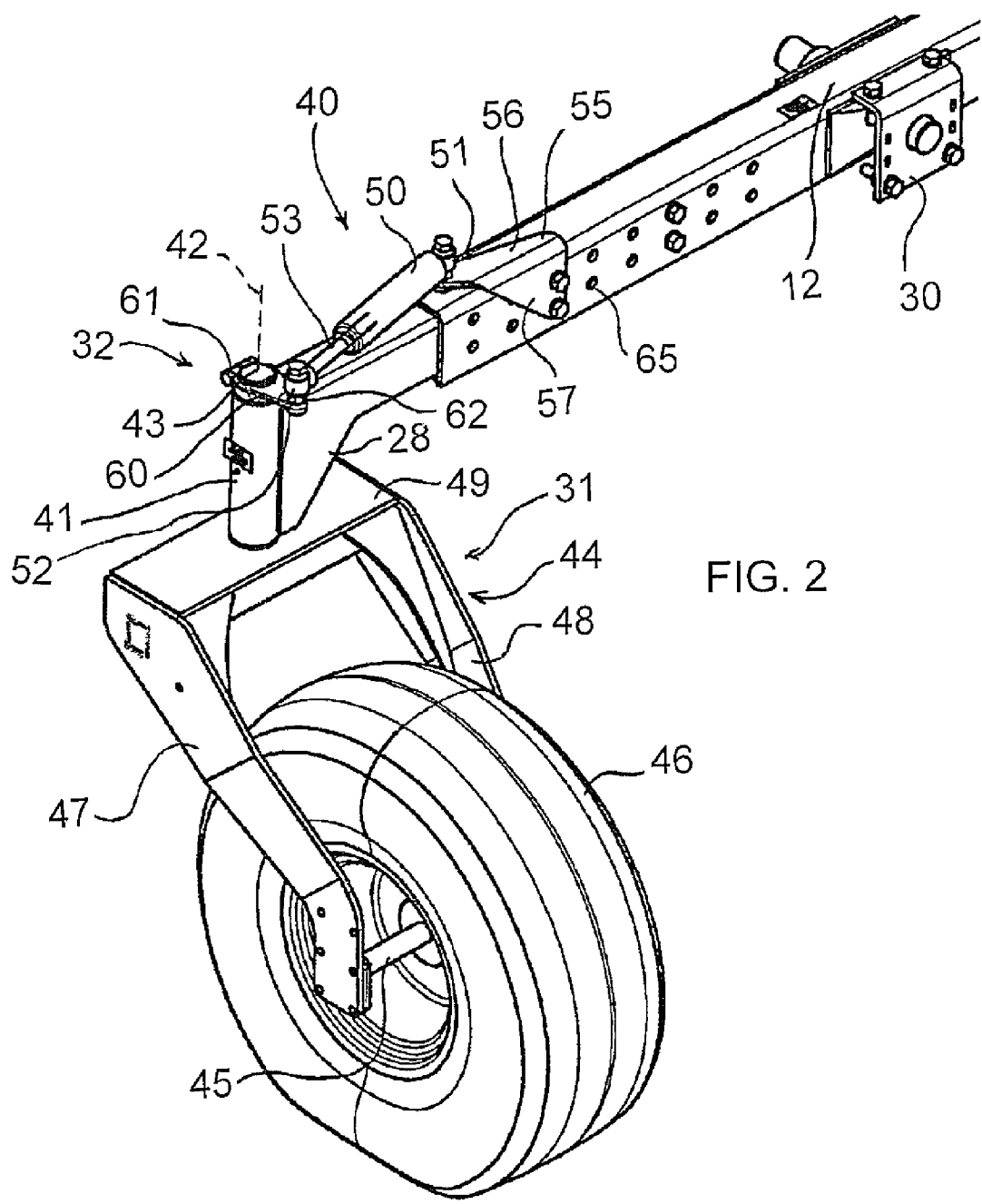
FIG. 2 is an isometric view taken from U.S. Pat. No. 7,077, 220 above showing one of the castor wheels according to the present invention in greater detail.

Turning now to FIG. 2, the damper 40 is shown in more detail with further detail of the castor wheel 31 and the axle 12. Thus as shown in FIG. 2, at the end of the axle 12 is mounted the extendable portion 28 which is fixed in place by bolts 30. The extendable portion 28 carries a sleeve 41 which defines a vertical pivot axis 42 of the swivel mounting 32. Within the sleeve 41 is mounted a pin 43 with the lower end of the pin attached to a castor link 44 carrying an axle 45 of the wheel 46. The link 44 is of a conventional arrangement providing two side arms or forks 47 and 48 extending from a transverse member 49 at the bottom of the pin 43 with each of the forks carrying a respective end of the axle 45. Thus the axle is located downwardly from the pivot mounting 32 and the axle is arranged rearwardly of the pivot axis 42 so that the castor wheel tends to trail behind the axis 42 as the vehicle moves. The assembly illustration shows a forked caster as described. An alternative arrangement (not shown) may use a formed caster. In the case of the formed caster the pivot shaft extends to a position below the supporting plate and is formed to get around one side of the tire. The axle is welded on and cantilevers out, that is it is not supported on the other side.

The damper 40 comprises a shock absorber cylinder or damping cylinder 50 with a rear coupling 51 at one end of the cylinder and a front coupling 52 at the outer end of the piston rod 53. Shock absorbers of this type are readily available and provide suitable damping forces while allowing the piston to slide within the cylinder against the resistance provided by the fluid within the cylinder. The rear coupling 51 is mounted on a bracket 55 having a horizontal support wall 56 and a vertical attachment wall 57 bolted to the side of the axle 12. Thus the horizontal mounting section 56 of the bracket defines a vertical post receiving the rear coupling 51 and allowing the rear end of the cylinder to pivot about the vertical axis defined by the vertical post. The opposite end 52 of the shock absorber 50 is attached to a lever 60 carried on the upper end of the pin 43 and rigidly attached thereto by a clamp, where the clamp is integral to the arm 61. The lever thus is arranged in a horizontal plane at the top of the pin 43 and also extends outwardly from the axis 42 in a radial direction therefrom within that horizontal plane. The lever is located so that a radius extending from the axis 42 and connecting to the link 52 extends along a center plane of the castor assembly so that the link also follows with the castor wheel and lies in the castor plane of the castor wheel that is a center plane parallel to the side arms or forks 47 and 48 and at right angles to the axle 45. To carry the load and ensure proper orientation, there is a key slot in the caster shaft and the arm and a square cross section key is installed. The link 52 is mounted on a bolt 62 standing vertically upwardly from the lever 60 again allowing pivotal movement of the link 52 relative to the post and relative to the lever. The position of the bracket 55 is arranged so that the shock absorber is approximately at its center position when the castor plane defined by the castor wheel extends at right angles to the axle 12 that is longitudinally of the vehicle and parallel to the center line 26 of the vehicle. The bracket 55 can be moved along the axle 12 by selecting for mounting of the bracket respective pairs of holes 65 at spaced positions along the axle 12. Thus as the extension portion 28 is moved outwardly, the bracket is also disconnected and moved so that its relative position to the lever remains unchanged.

The shock absorber 50 thus extends from the inner end lying on an axis extending vertically through the axle at an inclined direction to the longitudinal direction of the axle to the outer end of the lever 60. It will be appreciated that the fore/aft distance, although the radial distance does not change, of the coupling 52 from the axis 42 is at a maximum when the lever is at right angles to the axle 12. As the lever is rotated around the axis 42 through an angle which approaches 90°, the distance of the coupling from the center plane of the axle decreases thus decreasing the mechanical advantage of the lever. At the 90° position relative to the position as shown in FIG. 2, the shock absorber has no effect since the shock absorber is acting at right angles to the direction of movement and thus has zero effect at the 90° angle with the effect increasing as the angle changes from 90°.

Thus the shock absorber effect of the resistance force applied by the shock absorber to the movement of the castor wheel is at the maximum in the position shown in FIG. 2 and in a position 180° spacing from the position shown in FIG. 2. The force is at a minimum when the lever is at right angles to the position shown in FIG. 2 either extending toward the axle 12 or away from the axle 12. Thus the shock absorber in force varies through the rotation and is at maximum at positions where the force is primarily required, that is when the castor wheel is in its normal operating position with the vehicle moving in the implement forward direction or in the implement trailing transport direction.

In the present arrangement, each of the castor assemblies includes a mounting link defined by the side arms or forks 47 and 48 which connect the transverse axle 45 of the wheel at the bottom to the vertical pin 43 by the bottom transverse member 49 connected to a bottom of the vertical pivot pin 43. The mounting link thus interconnects the bottom transverse member 49 and the axle 45 such that the axle 45 is located below the pivot member 43 and, in respect of a forward direction of movement, in a plane radial to the vertical pivot axis 42 and rearwardly of the vertical pivot axis 42.

Figure 3:
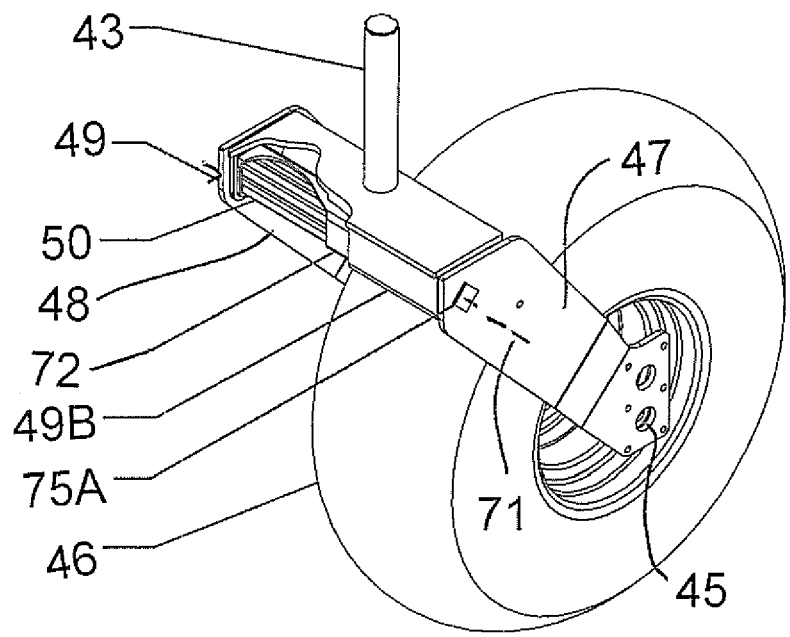
FIG. 3 is an isometric view of the castor wheel of FIG. 2.
Figure 4:
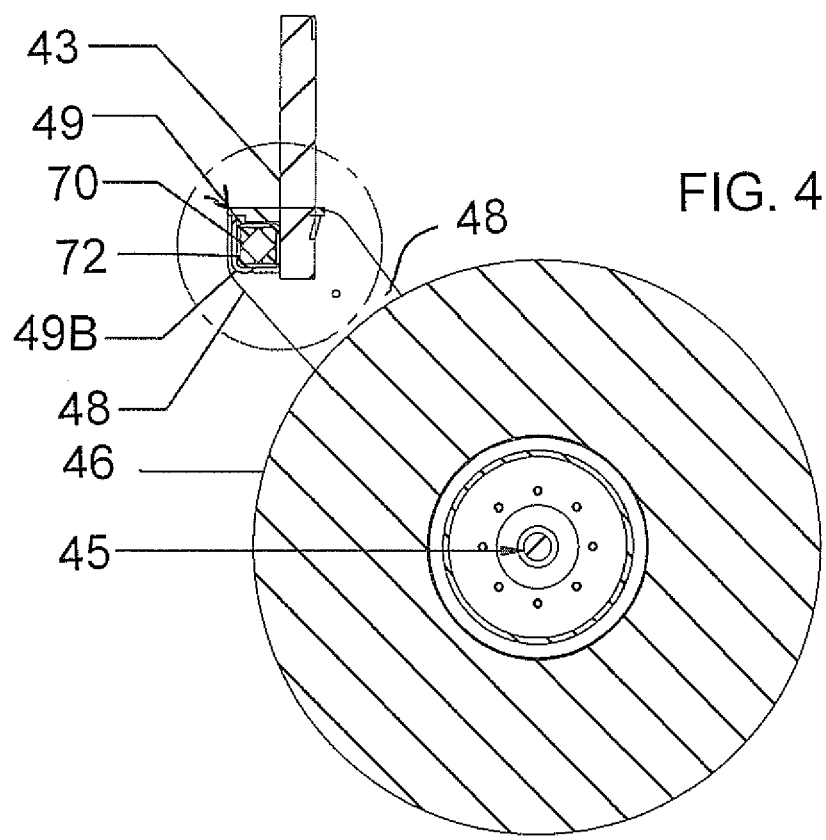
FIG. 4 is cross sectional view of the castor wheel of FIG. 2 taken along the lines a center line of the wheel.

Proceeding now to FIGS. 3, 4 and 5, in this arrangement, the mounting link includes a torsion spring generally indicated at 70 allowing spring suspension pivotal movement of the upper ends of the forks 47, 48 relative to the bottom transverse member 49 about an axis 71 parallel to the wheel axis of the axle 45.

The torsion spring 70 comprises a sleeve 72 mounted in the member 49 with the sleeve 72 being located within the tubular member 49 in front of the pin 43. It could also be behind the pin. Thus the tubular member 49 has a top wall 49A to which is attached a depending channel 49B so as to define a hollow interior 49C within which the rectangular tubular sleeve 72 fits. The torsion spring further includes a second inner sleeve 73 which is dimensioned so that it fits diagonally within the sleeve 72 so as to define triangular spaces between the corners 73A of the sleeve 73 and the outer sleeve 72. These are filled by resilient rubber or other elastomeric material pieces 74 which can flex as the sleeve 73 rotates within the sleeve 72. The pieces 74 extend along the sleeve 72 which extends along the member 49. A rod 75 passes through the sleeve 73 and is connected at each end to respective ones of the forks 47 and 48. The pieces 74 define an elastomeric mounting between the sleeve 72 and the rod 75 which allows rotation of the rod 75 relative to the sleeve 72 and therefore relative to the mounting 49. The rod 75 is square in cross section so as to pass as a sliding fit into the sleeve 73 and has square ends 75A fastened to the upper ends of the forks.

The bottom transverse member 49 thus comprises a tubular member with the vertical pivot rod 43 passing through the tubular member and welded to the top wall 49A and the channel 49B. The torsion spring 70 is mounted inside the tubular member 49 at a position on a side of the vertical pivot rod 43 which is opposite to that of the wheel 46.

The torsion arm suspension system described herein is simple with few moving parts. The two rear caster wheels can move independently of each other while remaining connected through the rear beam pivotally connected to the main frame of the tractor. The arrangement also provides a reduced shock loading of the walking beam and caster components. The suspension can react faster due to a reduced mass of the suspension components. The suspension provides dampening without the need for hydraulic shock absorbers and remains active all of the time since there is no requirement or ability for the suspension of the rear wheels to be locked out during high speed movement in transport to prevent instability. The system cooperates with the walking beam rear axle and the anti-shimmy damping system to provide an effective suspension which reduces pitching movements of the tractor during high speed operation in the field or higher speed transportation.

Another arrangement can be provided (not shown) where the mounting 49 is omitted and the pin 43 is connected directly to the sleeve and where the sleeve 73 is connected to the arms 47 and 48 by passing through cooperating holes in the arms.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. An agricultural tractor comprising:
    a tractor frame arranged for attachment to an implement to be moved in a longitudinal working direction across the ground;
    a first pair of ground wheels mounted on the frame at positions spaced transversely of the frame on either side of a center line of the frame;
    a transverse beam mounted on the frame at a position spaced longitudinally from the first pair of ground wheels;
    a second pair of ground wheels mounted on the beam at respective ends thereof;
    the beam being mounted on the frame for pivotal movement about a substantially horizontal axis along the center line of the tractor;
    each of the second ground wheels being mounted on the beam by a respective castor assembly;
    each of the castor assemblies comprising:
        a transverse axle of the wheel,
        a pivot member having a vertical rod defining a vertical pivot axis mounted in a swivel support of the beam and a bottom transverse member connected to a bottom of the vertical pivot rod,
        a mounting link interconnecting the bottom transverse member and the axle such that the axle is located below the pivot member and, in respect of a forward direction of movement, in a plane radial to the vertical pivot axis and rearwardly of the vertical pivot axis,
        the mounting link including a torsion spring allowing spring suspension pivotal movement of the upper ends mounting link relative to the bottom transverse member about an axis parallel to the wheel axis.

2. The tractor according to claim 1 wherein the torsion spring comprises a sleeve with a rod passing through the sleeve and an elastomeric mounting between the sleeve and the rod which allows rotation of the rod relative to the sleeve.

3. The tractor according to claim 2 wherein the sleeve is defined by the bottom transverse member of the pivot member and the rod extends across an upper end of the mounting link.

4. The tractor according to claim 3 wherein the rod is square in cross section and has at least one end fastened to the upper end of the mounting link.

5. The tractor according to claim 1 wherein the bottom transverse member comprises a tubular member with the vertical pivot rod passing through the tubular member.

6. The tractor according to claim 5 wherein the torsion spring is mounted inside the tubular member at a position on a side of the vertical pivot rod which is opposite to that of the wheel.

7. The tractor according to claim 1 wherein the mounting link is arranged to allow rotation of the wheel around the pivot axis so that the tractor can move in the direction of forward working movement with the first pair of ground wheels forward and the second pair of ground wheels trailing and in a second direction of movement opposite to the direction of forward working movement with the second pair of ground wheels forward and the first pair of ground wheels trailing.

8. The tractor according to claim 1 wherein each of the first pair of ground wheels is driven by a respective drive motor which allows variable speed in both the first and second directions such that steering of the tractor is effected by a differential in speed between the first wheels with the second wheels following the steering in a castoring action.

9. The tractor according to claim 1 wherein there is provided a pair of damper cylinders each connected between the frame and a respective one of a pair of levers where each lever is arranged at a respective one of the castor assemblies so as to provide a damping force tending to restrict rotation of the respective second wheel about the respective vertical pivot axis.

10. The tractor according to claim 9 wherein the damper cylinders and the levers are arranged such that the damping force for each castor assembly varies at different angles around the vertical pivot axis due to changes in mechanical advantage as the lever pivots around the vertical pivot axis and is at a maximum value when the second wheels are parallel to the center line and the tractor is moving in the direction of forward working movement and is at a maximum value when the second wheels are parallel to the center line and the tractor is moving in the opposite direction.

11. The tractor according to claim 1 wherein the mounting link includes a pair of parallel forks having upper ends of the forks connected to respective ends of the bottom transverse member and carry at a lower ends of the forks between the forks the transverse axle of the wheel.

12. The tractor according to claim 11 wherein the sleeve is defined by the bottom transverse member of the pivot member and the rod extends between the upper ends of the forks.

13. An agricultural tractor comprising:
  a tractor frame arranged for attachment to an implement to be moved in a longitudinal working direction across the ground;
  a first pair of ground wheels mounted on the frame at positions spaced transversely of the frame on either side of a center line of the frame;
  a transverse beam mounted on the frame at a position spaced longitudinally from the first pair of ground wheels;
  a second pair of ground wheels mounted on the beam at respective ends thereof;
  each of the second ground wheels being mounted on the beam by a respective castor assembly;
  each of the castor assemblies comprising:
    a transverse axle of the wheel,
    a pivot member having a vertical rod defining a vertical pivot axis mounted in a swivel support of the beam and a bottom transverse member connected to a bottom of the vertical pivot rod,
    a mounting link interconnecting the bottom transverse member and the axle such that the axle is located below the pivot member and, in respect of a forward direction of movement, in a plane radial to the vertical pivot axis and rearwardly of the vertical pivot axis,
    the mounting link including a torsion spring allowing spring suspension pivotal movement of the upper ends mounting link relative to the bottom transverse member about an axis parallel to the wheel axis;
  wherein the bottom transverse member comprises a tubular member with the vertical pivot rod passing through the tubular member.

14. The tractor according to claim 13 wherein the torsion spring is mounted inside the tubular member at a position on a side of the vertical pivot rod which is opposite to that of the wheel.

15. The tractor according to claim 13 wherein the torsion spring comprises a sleeve with a rod passing through the sleeve and an elastomeric mounting between the sleeve and the rod which allows rotation of the rod relative to the sleeve.

16. The tractor according to claim 15 wherein the sleeve is defined by the bottom transverse member of the pivot member and the rod extends across an upper end of the mounting link.

17. The tractor according to claim 15 wherein the mounting link includes a pair of parallel forks having upper ends of the forks connected to respective ends of the bottom transverse member and carry at a lower ends of the forks between the forks the transverse axle of the wheel.

18. The tractor according to claim 17 wherein the sleeve is defined by the bottom transverse member of the pivot member and the rod extends between the upper ends of the forks.

\* \* \* \* \*